(12) United States Patent
Murata

(10) Patent No.: US 12,123,408 B2
(45) Date of Patent: Oct. 22, 2024

(54) FLANGE CONNECTION STRUCTURE AND DIAPHRAGM PUMP

(71) Applicants: YTS JAPAN Co., Ltd., Yotsukaido (JP); Shigeru Murata, Yotsukaido (JP)

(72) Inventor: Shigeru Murata, Yotsukaido (JP)

(73) Assignees: Shigeru Murata, Yotsukaido (JP); YTS JAPAN Co., Ltd., Yotsukaido (JP)

( * ) Notice: Subject to any disclaimer, the term of this patent is extended or adjusted under 35 U.S.C. 154(b) by 0 days.

(21) Appl. No.: 18/065,526

(22) Filed: Dec. 13, 2022

(65) Prior Publication Data

US 2023/0193891 A1 Jun. 22, 2023

(30) Foreign Application Priority Data

Dec. 16, 2021 (JP) ................................ 2021-204282

(51) Int. Cl.
*F04B 43/02* (2006.01)
*F04B 43/06* (2006.01)
*F16L 21/00* (2006.01)

(52) U.S. Cl.
CPC .............. *F04B 43/02* (2013.01); *F04B 43/06* (2013.01); *F16L 21/005* (2013.01)

(58) Field of Classification Search
CPC ....... F16L 21/005; F16L 21/007; F16L 23/04; F04B 43/02; F04B 43/06
See application file for complete search history.

(56) References Cited

U.S. PATENT DOCUMENTS 8,469,680 B2 * 6/2013 Murata ..................... F04B 9/12
91/348
2004/0245775 A1 12/2004 Muroi et al.

FOREIGN PATENT DOCUMENTS

| EP | 3412879 A1 * | 12/2018 | ......... F01N 13/0097 |
| JP | S5586185 U | 6/1980 | |
| JP | 2001041371 A | 2/2001 | |
| JP | 2004360838 A | 12/2004 | |
| JP | 2007309293 A | 11/2007 | |
| JP | 2019027281 A | 2/2019 | |
| JP | 2020153404 A | 9/2020 | |
| WO | WO-2014086451 A1 * | 6/2014 | ............ B60T 17/043 |

OTHER PUBLICATIONS

[English Translation] Notice of Reasons for Refusal for Japanese Patent Application No. 2021-204282 mailed on Jan. 31, 2022, pp. all.

* cited by examiner

*Primary Examiner* — Philip E Stimpert
(74) *Attorney, Agent, or Firm* — Dorsey & Whitney LLP

(57) ABSTRACT

An adjusting member may cause an axis line of connection end portions and an axis line of a housing side flange portion to be eccentric with respect to each other. The connection end portions and the housing side flange portions may be connected and the first attaching portion and the second attaching portion may be rotated to compress a sealing member. The position where the sealing member contacts an end face of the connection end portions may change by rotating each attaching portion and two connection targets can be directly connected.

4 Claims, 2 Drawing Sheets

FLANGE CONNECTION STRUCTURE AND DIAPHRAGM PUMP

CROSS REFERENCE TO RELATED APPLICATIONS

This application claims the benefit of Japanese Patent Application No. 2021-204282, filed on Dec. 16, 2021, which is hereby incorporated by reference in its entirety.

BACKGROUND

Technical Field

The present disclosure relates to a flange connection structure and a diaphragm pump.

Background

Conventionally, a diaphragm pump has been proposed that includes a pair of operating fluid chambers and a pair of fluid delivery chambers that are partitioned by a diaphragm body and a reciprocally moving center rod and that draws and discharges a fluid (see, for example, Japanese Patent Laid-Open No. 2019-27281). In the diaphragm pump described in Japanese Patent Laid-Open No. 2019-27281, the fluid delivery chambers communicate with flow path portions and coupling members connecting a pair of the flow path portions are provided on a suction side and a discharging side. In this manner, in flowing from the suction side toward the discharging side, the fluid is temporarily branched to flow toward each of a pair of the fluid delivery chambers and remerges in flowing from the fluid delivery chambers toward the discharging side.

SUMMARY

In a diaphragm pump as described in Japanese Patent Laid-Open No. 2019-27281, since a pair of fluid delivery chambers are formed with a plurality of members assembled, an error in a distance between a pair of flow path portions may possibly occur. Since connecting positions of coupling members that are connected to the flow path portions are predetermined, if an error as described above occurs, a difference between the distance between the pair of connecting positions and the distance between the pair of the flow path portions is generated. When the coupling members and the flow path portions are connected with a state in which such a difference in the distance is generated, there has been a possibility that a sealing member cannot be properly compressed in one of the connecting sites, which becomes a cause of leakage.

Thus, a method may be considered in which an intermediate member, such as an eccentric flange or the like, is provided between the flow path portion and the connecting portion so as to eliminate the difference in the distance. However, in a case where such an intermediate member is provided, a sealing member needs to be provided respectively between the intermediate member and the flow path portion and between the intermediate member and the coupling member, and thus, the cost tends to increase due to the number of parts increased and the structure complicated.

The present disclosure is related to providing a flange connection structure and a diaphragm pump that are capable of suppressing leakage of a fluid at low cost.

The present disclosure is a flange connection structure in a diaphragm pump having a pair of operating fluid chambers, a pair of fluid delivery chambers, a diaphragm body partitioning each of the fluid delivery chambers and each of the operating fluid chambers, a center rod connected to a pair of the diaphragm bodies and reciprocally moving, and connection units connecting the pair of fluid delivery chambers, the flange connection structure being configured to connect a connection end portion of each of the connection units and a target end portion communicating with each of the fluid delivery chambers, the flange connection structure including a sealing member disposed between an end face of the connection end portion and an end face of the target end portion, a fixing member fixing the connection end portion and the target end portion while compressing the sealing member, and an adjusting member including a first attaching portion attached to the connection end portion and a second attaching portion attached to the target end portion, in which in the adjusting member, the first attaching portion is rotatable having a direction orthogonal to the end face of the connection end portion as an axis line direction and the second attaching portion is rotatable having a direction orthogonal to the end face of the target end portion as an axis line direction, and an axis line of the connection end portion and an axis line of the target end portion are caused to be eccentric with respect to each other.

According to the aforementioned present disclosure, in the adjusting member that causes the axis lines of the connection end portion and the target end portion to be eccentric with respect to each other, in a case where an error occurs in the distance between the axis lines of the pair of target end portions, the first attaching portion and the second attaching portion are rotated so that the connection end portion and the target end portion can be connected in such a manner as eliminating the error. For example, in a case where the distance between the pair of target end portions is smaller than a design value (a value equivalent to the distance between the pair of connection end portions), in the adjusting member, it is only necessary to set the rotating angle such that the first attaching portion is positioned on the outer side relative to the second attaching portion. In this manner, the impact of the error in the distance between the pair of target end portions is reduced, thereby properly compressing the sealing member to thus enable to suppress leakage of a fluid.

Further, in the configuration in which the axis lines of the connection end portion and the target end portion are caused to be eccentric with respect to each other by the adjusting member as described above, each attaching portion is rotated so that the position where the sealing member contacts at least one of the end faces of the connection end portion and the target end portion changes. In this manner, two connection targets (the connection end portion and the target end portion) are directly connected and the sealing member is sandwiched by the end faces to thus facilitate proper compression. With such a direct connection, the number of sealing portions to be used is reduced to thus enable to reduce the cost.

In doing so, in the flange connection structure, it is preferable that one of the first attaching portion and the second attaching portion should include a through hole through which the connection end portion or the target end portion is inserted and the other of the first attaching portion and the second attaching portion should include a fitting portion to be fitted to the end face of the connection end portion or of the target end portion. According to such a configuration, with the connection end portion or the target end portion inserted into the through hole, the adjusting member is temporarily assembled with the connection unit or a member having the target end portion and the adjusting member is rotated with such a state, so that the fitting portion can be fitted to the end face at a rotating angle that optimizes the distance between the pair of first attaching portions or between the pair of second attaching portions. In this manner, the adjusting operation can be facilitated.

Further, in the flange connection structure, it is preferable that at least one of the first attaching portion and the second attaching portion should include a through hole through which the connection end portion or the target end portion is inserted and a transmission part transmitting force through direct or indirect engagement with the connection end portion or the target end portion in moving in a direction of compressing the sealing member. According to such a configuration, the rotation can be guided by the through hole and the force is transmitted by the transmission part to thus facilitate the compression of the sealing member.

Furthermore, in the flange connection structure, it is preferable that only one of the first attaching portion and the second attaching portion should include the through hole and the transmission part, the adjusting member should include an adjusting-side tapered outer peripheral surface having a diameter increased as the adjusting-side tapered outer peripheral surface approaches the other of the first attaching portion and the second attaching portion, the connection end portion or the target end portion to which the other of the first attaching portion and the second attaching portion is attached should include a flange-side tapered outer peripheral surface having a diameter increased as the flange-side tapered outer peripheral surface approaches the adjusting member, and the fixing member should be clamped so as to exert force on an inner periphery side while abutting on the flange-side tapered outer peripheral surface and the adjusting-side tapered outer peripheral surface. According to such a configuration, the fixing member is clamped to thus enable to generate the force to compress the sealing member, thereby enabling to improve the sealing property.

Meanwhile, the diaphragm pump includes any one of the flange connection structures described above. According to such a diaphragm pump, leakage of a fluid can be suppressed at low cost as described above.

According to the flange connection structure and the diaphragm pump, the axis lines of the connection end portion and the target end portion are caused to be eccentric with respect to each other by the adjusting member so that leakage of a fluid can be suppressed at low cost.

DETAILED DESCRIPTION

Figure 1:
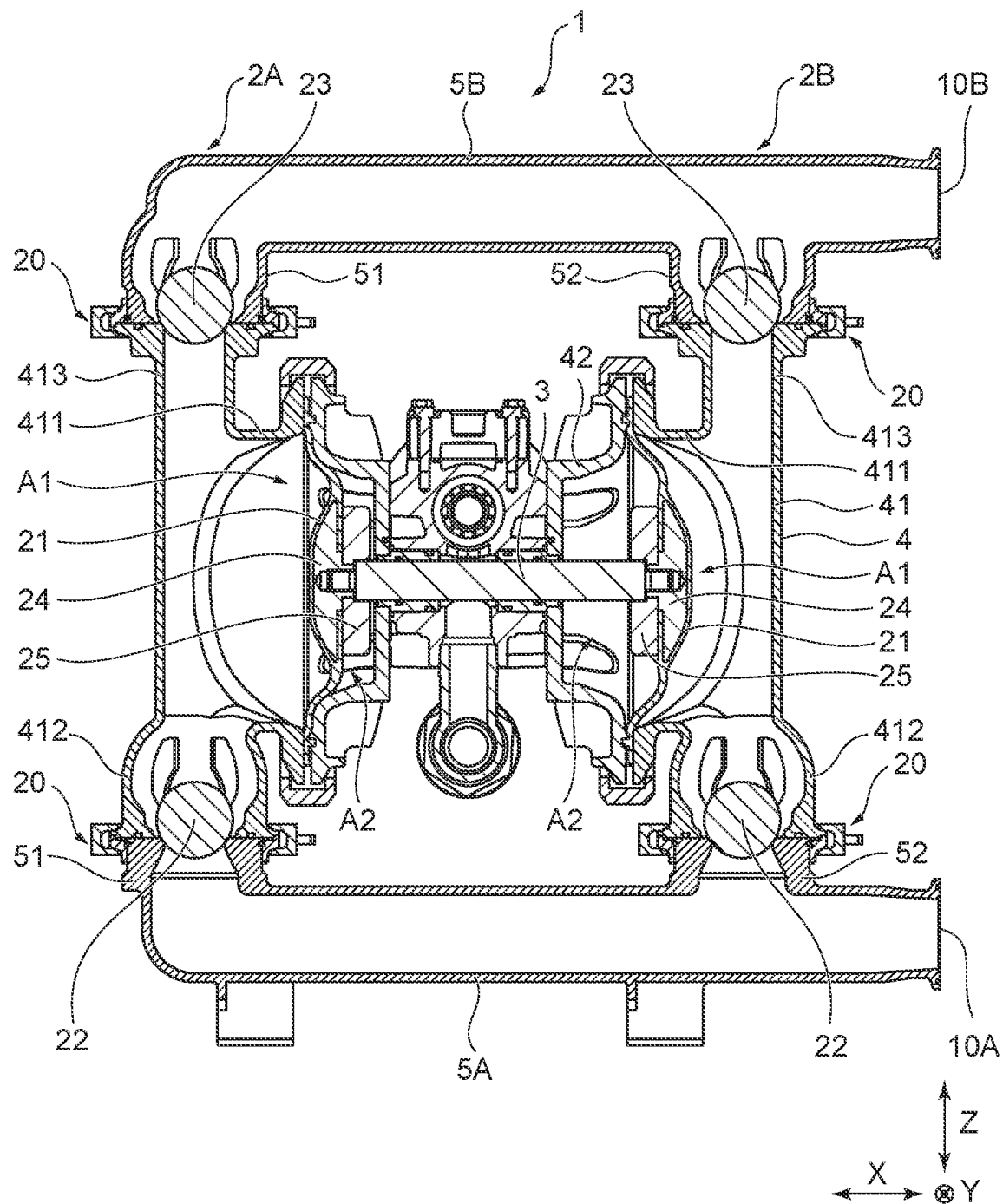
FIG. 1 is a cross-sectional view showing a diaphragm pump provided with a flange connection structure according to an embodiment of one example of the present disclosure.

An embodiment of the present disclosure will be described with reference to the accompanying drawings. A diaphragm pump provided with a flange connection structure 20 of the present embodiment includes a pump body 1 shown in FIG. 1, a switching device, and a supply unit, and is configured to draw and discharge a fluid such as a liquid by using gas, for example, air, as an operating fluid (the fluid to be drawn and discharged is referred to as a "target fluid"). In the present embodiment, the up-down direction of the pump body 1 is defined as a Z-direction, an axis line direction (extending direction) of a center rod 3 described later is defined as an X-direction, and a direction substantially orthogonal to both the X-direction and the Z-direction is defined as a Y-direction, and the top and the bottom in the Z-direction and the left and the right in the X-direction are based on FIG. 1. Note that the pump body 1 may be disposed such that the Z-direction is along the vertical direction or may be disposed with some inclination.

The pump body 1 includes a pair of pump portions 2A and 2B, the center rod 3, a detection device, a casing 4, and connection units 5A and 5B. The pair of pump portions 2A and 2B are formed symmetrically with respect to each other and each include a diaphragm body 21 connected to the center rod 3, an inlet-side check valve 22, and an outlet-side check valve 23. The diaphragm bodies 21 are connected (fixed) to the opposite end portions of the center rod 3 by means of discs 24 and 25.

The casing 4 includes a housing 41 and a main body portion 42 disposed on the inner side of the housing 41 and through which the center rod 3 extends. The diaphragm body 21 partitions a space between the housing 41 and the main body portion 42 into a fluid delivery chamber (pump chamber) A1 and an operating fluid chamber A2. Specifically, the fluid delivery chamber A1 is formed between the housing 41 and the diaphragm body 21 and the operating fluid chamber A2 is formed between the main body portion 42 and the diaphragm body 21. Note that in the present embodiment, the fluid delivery chamber A1 is formed on the outer side of the diaphragm body 21, but the fluid delivery chamber may be formed on the inner side of the diaphragm body 21.

The housing 41 includes a tubular portion 411 having the X-direction as the axis line direction, and housing-side flange portions 412 and 413 that are continuous with end portions on the outer side (the side distanced from the diaphragm body 21) in the X-direction of the tubular portion 411. In the housing 41, the fluid delivery chamber A1 is formed mainly by the tubular portion 411 and the housing-side flange portions 412 and 413 communicate with the fluid delivery chamber A1 and function as target end portions. In FIG. 1, the housing-side flange portion 412 extending toward the lower side from the tubular portion 411 is a fluid inlet side and the housing-side flange portion 413 extending toward the upper side is a fluid outlet side.

The connection unit 5A is provided on the fluid inlet side and is connected to the housing-side flange portions 412 of the pair of pump portions 2A and 2B so as to connect a pair of the fluid delivery chambers A1 to each other. The connection unit 5B is provided on the fluid outlet side and is connected to the housing-side flange portions 413 of the pair of pump portions 2A and 2B so as to connect the pair of fluid delivery chambers A1 to each other. The connection units 5A and 5B each include a pair of connection end portions 51 and 52 that are connected to each of the housing-side flange portions 412 and 413 of the pair of pump portions 2A and 2B. The flange connection structure 20 is formed between the connection end portions 51 and 52 and each of the housing-side flange portions 412 and 413 that are connected to each other.

The inlet-side check valve 22 is provided between the housing-side flange portion 412 and the connection end portions 51 and 52 of the connection unit 5A, and the outlet-side check valve 23 is provided between the housing-side flange portion 413 and the connection end portions 51 and 52 of the connection unit 5B.

When the center rod 3 extending having the X-direction as the axial direction moves in the X-direction so that the diaphragm bodies 21 deform and the fluid delivery chamber A1 in the pump portion 2A as one of the pump portions expands (the operating fluid chamber A2 contracts), the fluid delivery chamber A1 in the pump portion 2B as the other of the pump portions contracts (the operating fluid chamber A2 expands). Further, when the fluid delivery chamber A1 in the pump portion 2A as one of the pump portions contracts, the fluid delivery chamber A1 in the pump portion 2B as the other of the pump portions expands.

When the fluid delivery chamber A1 expands and the pressure is reduced, the inlet-side check valve 22 opens so that a target fluid is introduced from an inlet-side opening 10A into the fluid delivery chamber A1. Meanwhile, when the fluid delivery chamber A1 contracts and the pressure is increased, the outlet-side check valve 23 opens so that the target fluid within the fluid delivery chamber A1 is discharged from an outlet-side opening 10B to the outside.

The detection device includes a detector disposed on a center side (inner side) in the X-direction relative to the diaphragm bodies 21, and the detector abuts on the discs 25 connected to the diaphragm bodies 21 to be movable.

While the operating fluid is supplied to the operating fluid chamber A2 of the pump portion 2B as the other of the pump portions, in the pump portion 2A as one of the pump portions, the operating fluid chamber A2 is contracted so that the diaphragm body 21 approaches the detector of the detection device and thus, the detector is pressed. Thus, the switching device operates to switch a supply destination, that is, the operating fluid is no longer supplied to the operating fluid chamber A2 of the pump portion 2B as the other of the pump portions, and the operating fluid is supplied to the operating fluid chamber A2 of the pump portion 2A as one of the pump portions, so that the operating fluid chamber A2 of the pump portion 2A as one of the pump portions expands. Note that the switching device simply having the similar configuration as the configuration of the conventional diaphragm pump may be used, and the description is omitted herein. By repeating the above, in the pair of pump portions 2A and 2B, the operating fluid chambers A2 alternately repeat the expansion and the contraction. In this manner, the target fluid introduced from the inlet-side opening 10A is discharged from the outlet-side opening 10B and the target fluid is supplied to the outside.

Figure 2:
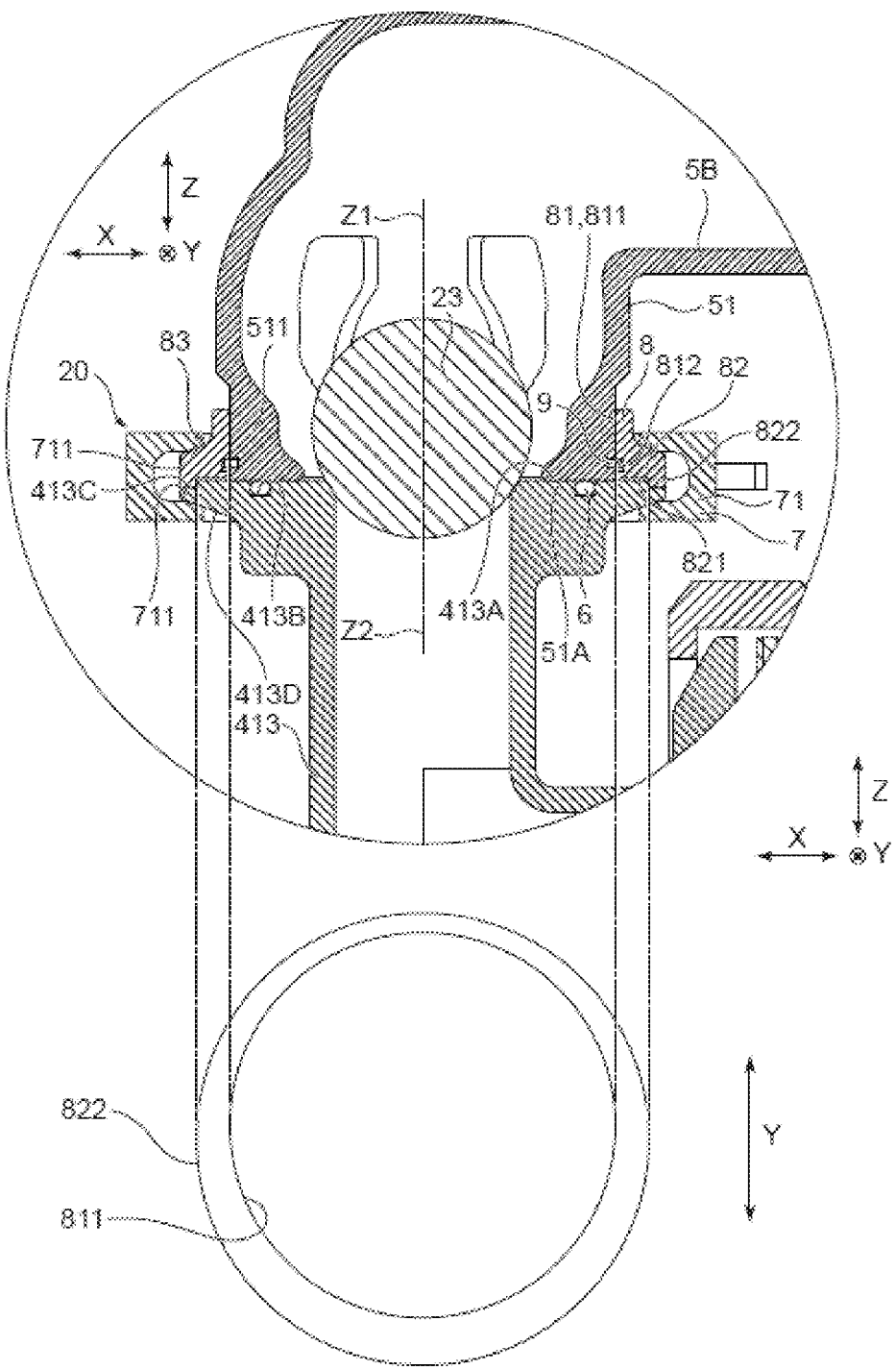
FIG. 2 is a cross-sectional view showing an enlarged main part of the diaphragm pump.

Herein, the details of the flange connection structure 20 will be described with reference to FIG. 2. The flange connection structure 20 connects the connection end portions 51 and 52 of the connection units 5A and 5B and the housing-side flange portions 412 and 413 as the target end portions in the diaphragm pump 1. In the diaphragm pump 1, the flange connection structures 20 are formed on each of the inlet-side and the outlet-side so as to correspond to both the pair of pump portions 2A and 2B, and four flange connection structures 20 in total are formed. In FIG. 2, the flange connection structure 20 on the outlet-side and on the pump portion 2A side is shown and the flange connection structure 20 will be described below, but the other three flange connection structures 20 (in particular, the adjusting member 8 described later) also have the similar configuration.

The flange connection structure 20 includes a sealing member 6, a fixing member 7, and the adjusting member 8. The sealing member 6 is an O-ring formed with an elastic member such as rubber, and is disposed between an end face 413A of the housing-side flange portion 413 and an end face 51A of the connection end portion 51. The end face 413A and the end face 51A face against the Z-direction and the direction in which the sealing member 6 is compressed is the Z-direction. On the end face 413A, an annular groove portion 413B that houses the sealing member 6 is formed. The depth of the groove portion 413B is smaller than the diameter of the sealing member 6. Note that the groove portion that houses the sealing member 6 may be formed on the end face 51A of the connection end portion 51 or the configuration may be made such that the groove portion is formed on neither of the end faces.

The fixing member 7 is a clamp that is generally annularly formed and includes two semicircular portions 71, a hinge portion that connects end portions of the semicircular portions 71, a wing screw provided at a free end of one of the two semicircular portions 71, and a locking portion that is provided at a free end of the other of the two semicircular portions 71 and that locks the wing screw. Specifically, the configuration is made such that as the wing screw is locked to the locking portion and is clamped, the free ends of the two semicircular portions 71 approach to each other so as to exert the clamping force on the inner periphery side. Note that the fixing member 7 only needs to generate the clamping force to be exerted on the inner periphery side and an annular part may be divided into three or more parts, and the specific structure, such as the number and the shape of the screwing members for clamping, is not limited to the aforementioned structure.

In the semicircular portion 71, the inner periphery side is formed in a recessed shape and a pair of inclined surfaces 711 facing against the Z-direction are formed. The pair of inclined surfaces 711 have inclinations that are further distanced from each other as the inclined surfaces 711 progress toward the inner periphery side.

The adjusting member 8 includes a first attaching portion 81 to be attached to the connection end portion 51, a second attaching portion 82 to be attached to the housing-side flange portion 413, and an adjusting-side tapered outer peripheral surface 83.

The connection end portion 51 includes, at the tip end portion, a cylindrical straight portion 511 having an outer diameter substantially constant. A recessed portion is formed on the outer peripheral surface of the straight portion 511 and a ring member 9 is attached to the recessed portion. The ring member 9 projects from the outer peripheral surface of the straight portion 511. The first attaching portion 81 includes a circular through hole 811 through which the connection end portion 51 is inserted and a transmission part 812 to be engaged with the ring member 9.

The straight portion 511 is inserted into the through hole 811 and the inner diameter of the through hole 811 is substantially equivalent to or slightly greater than the outer diameter of the straight portion 511. The first attaching portion 81 is rotatably attached to the connection end portion 51 having the Z-direction, which is a direction orthogonal to the end face 51A, as the axis line direction. At this time, the center axis of the through hole 811 and the center axis of the straight portion 511 (the axis line Z1 of the connection end portion 51) correspond to each other. On the inner peripheral surface of the through hole 811, a portion having an inner diameter smaller than the outer diameter of the ring member 9 and a portion having an inner diameter equivalent to or slightly greater than the outer diameter of the ring member 9 are formed, and the underside of a step portion between the portions abuts on the ring member 9 to become the transmission part 812. Specifically, when the adjusting member 8 moves to the lower side relative to the connection end portion 51 (the direction in which the sealing member 6 is compressed), the transmission part 812 indirectly engages with the connection end portion 51 (via the ring member 9) so as to transmit the force to the connection end portion 51.

The second attaching portion 82 includes an annular end face 821 facing the lower side (the housing-side flange portion 413 side) and a cylindrical portion 822 projecting toward the lower side from the outer periphery portion of the end face 821. On the outer periphery portion of the end face 413A of the housing-side flange portion 413, a recessed portion 413C to be fitted to the cylindrical portion 822 is formed. The inner diameter of the cylindrical portion 822 is equivalent to or slightly greater than the outer diameter of the recessed portion 413C. In this manner, with a state in which the cylindrical portion 822 is housed in the recessed portion 413C, the adjusting member 8 is rotatable relative to the housing-side flange portion 413. Specifically, the cylindrical portion 822 functions as a fitting portion to be fitted to the recessed portion 413C formed on the end face 413A of the housing-side flange portion 413. The first attaching portion 82 is rotatably attached to the housing-side flange portion 413 having the Z-direction, which is a direction orthogonal to the end face 413A, as the axis line direction. At this time, the center axis of the cylindrical portion 822 and the center axis of the housing-side flange portion 413 (the axis line Z2 of the housing-side flange portion 413) correspond to each other. Note that in the illustrated example, the axis line Z1 and the axis line Z2 correspond to each other as viewed in the Y-direction.

In the adjusting member 8, the center axis of the through hole 811 of the first attaching portion 81 and the center axis of the cylindrical portion 822 of the second attaching portion 82 are disposed in parallel and so as to be displaced with respect to each other on an X-Y plane (displaced in the Y-direction in the illustrated example). Therefore, when the first attaching portion 81 is attached to the connection end portion 51 and the second attaching portion 82 is attached to the housing-side flange portion 413, the axis line Z1 of the connection end portion 51 and the axis line Z2 of the housing-side flange portion 413 are eccentric with respect to each other. A displacement amount D between the center axis of the through hole 811 and the center axis of the cylindrical portion 822 only needs to be around 0.5-1.5 mm, for example. Note that in the present embodiment, the center axis of each attaching portion and the axis lines Z1 and Z2 correspond to each other, but may not correspond to each other. For example, the center axes of the cylindrical portion 822 and the recessed portion 413C may be displaced from the axis line Z2 of the housing-side flange portion 413.

The adjusting-side tapered outer peripheral surface 83 has a diameter increased as the adjusting-side tapered outer peripheral surface 83 progresses toward the lower side (the side of the second attaching portion 82 and the housing-side flange portion 413). An inclination angle of the adjusting-side tapered outer peripheral surface 83 corresponds to an inclination angle of one of the pair of inclined surfaces 711 of the fixing member 7 and the adjusting-side tapered outer peripheral surface 83 is in surface contact with the inclined surface 711.

The housing-side flange portion 413 to which the second attaching portion 82 is attached is in a flange shape by having a diameter annularly increased on the tip end side. The outer diameter of the housing-side flange portion 413 is greater than the outer diameter of the connection end portion 51 and is substantially equivalent to the maximum outer diameter (the outer diameter in the lower end portion) of the adjusting member 8. The housing-side flange portion 413 includes a flange-side tapered outer peripheral surface 413D in a region on the upper side of the outer peripheral surface.

An inclination angle of the flange-side tapered outer peripheral surface 413D corresponds to an inclination angle of the other of the pair of inclined surfaces 711 of the fixing member 7 and the flange-side tapered outer peripheral surface 413D is in surface contact with the inclined surface 711.

The adjusting-side tapered outer peripheral surface 83, the flange-side tapered outer peripheral surface 413D, and the inclined surface 711 have inclinations as described above, so that when the fixing member 7 is clamped to exert force on the inner periphery side, the force to bring the adjusting member 8 and the connection end portion 51, and the housing-side flange portion 413 closer to the Z-direction is generated to thus compress the sealing member 6.

Next, a method for connecting the connection end portions 51 and 52 and the housing-side flange portion 413 by means of the connection unit 5B on the outlet side will be described by presenting a specific example. Note that the similar method may also be adopted on the inlet side.

For example, it is assumed that the distance between the pair of housing-side flange portions 413 (that is, the distance between the axis lines Z2) is greater than a design value due to a manufacturing error or the like. Specifically, the distance between the axis lines Z1 in the connection unit 5B is smaller than the distance between the axis lines Z2. In this case, a pair of the adjusting members 8 are attached to the housing-side flange portions 413 and the connection end portions 51 in an orientation in which the center axis of each through hole 811 is disposed on the inner side in the X-direction relative to the center axis of each cylindrical portion 822. The orientation may be set such that as the difference between the distance between the axis lines Z1 and the distance between the axis lines Z2 increases, the center axis of the through hole 811 may be positioned so as to get closer to the inner side. As long as the difference between the distance between the axis lines Z1 and the distance between the axis lines Z2 is twice or less than twice the displacement amount D, the connection end portions 51 and 52 and the housing-side flange portion 413 can be properly connected.

When each attaching portion 81, 82 is rotated as described above, the position where the sealing member 6 contacts the end face 51A of the connection end portions 51 and 52 changes. The entire upper surface side of the sealing member 6 contacts the end face 51A at any rotation angle to enable to compress the sealing member 6.

The specific example of the method for determining the rotating angle of each attaching portion 81, 82 in accordance with the difference between the distance between the axis lines Z1 and the distance between the axis lines Z2 is as follows. First, the straight portion 511 is inserted into the through hole 811 to attach the pair of adjusting members 8 to the connection unit 5B. Next, the end face 51A of the connection end portions 51 and 52 and the end face 413A of the housing-side flange portion 413 are brought closer to each other. At this time, when the distance between the center axes of the cylindrical portions 822 of the pair of adjusting members 8 is different from the distance between the axis lines Z2, the cylindrical portions 822 of the adjusting members 8 are not both fitted to the recessed portions 413C simultaneously. Specifically, although the adjusting members 8 attempt to move downward due to the gravity, a part of the cylindrical portions 822 abuts on a portion on the inner side relative to the recessed portion 413C so that the movement is restricted.

From the aforementioned state, both the pair of adjusting members 8 are simultaneously rotated about the axis lines Z1. When the distance between the center axes of the cylindrical portions 822 of the pair of adjusting members 8 corresponds to the distance between the axis lines Z2, the adjusting members 8 move downward so that the cylindrical portions 822 can be fitted to the recessed portions 413C. At this time, the cylindrical portion 822 and the recessed portion 413C are both formed circular, and thus can be fitted together at any rotating angle. Note that in the present example, the pair of adjusting members 8 are both rotated simultaneously, but only one of the adjusting members 8 may be rotated so that the cylindrical portion 822 and the recessed portion 413C are fitted together, and subsequently, only the other of the adjusting members 8 may be rotated so that the cylindrical portion 822 and the recessed portion 413C are fitted together.

In the aforementioned example, the distance between the axis lines Z1 is smaller than the distance between the axis lines Z2, but when the distance between the axis lines Z1 is greater than the distance between the axis lines Z2, the adjusting members 8 only need to be oriented such that the center axis of the through hole 811 is disposed on the outer side in the X-direction relative to the center axis of the cylindrical portion 822. Further, when the distance between the axis lines Z1 is equivalent to the distance between the axis lines Z2, the adjusting members 8 only need to be disposed such that the center axis of the through hole 811 and the center axis of the cylindrical portion 822 are arranged side by side in the Y-direction, for example.

According to the present embodiment above, in the adjusting member 8 that causes the axis line Z1 of the connection end portions 51 and 52 and the axis line Z2 of the housing-side flange portion 413 to be eccentric with respect to each other, when an error occurs in the distance between the pair of axis lines Z2, the connection end portions 51 and 52 and the housing-side flange portion 413 can be connected so as to eliminate the error by rotating the first attaching portion 81 and the second attaching portion 82. In this manner, the sealing member 6 is properly compressed to thus enable to suppress leakage of a fluid. Further, the position where the sealing member 6 contacts the end face 51A of the connection end portions 51 and 52 changes by rotating each attaching portion 81, 82. In this manner, while the two connection targets are directly connected, the sealing member 6 is sandwiched by the end faces 413A and 51A to be more easily properly compressed. According to such a direct connection, as compared to the configuration including an intermediate member such as an eccentric flange, the number of sealing members to be used is reduced so that the cost can be reduced.

Further, the first attaching portion 81 includes the through hole 811 and the second attaching portion 82 includes the cylindrical portion 822 as a fitting portion, so that the adjusting member 8 is rotated with a state in which the adjusting member 8 is temporarily assembled with the connection units 5A and 5B with the connection end portion 51 inserted into the through hole 811, and thus, the cylindrical portion 822 can be fitted to the recessed portion 413C at a rotating angle that optimizes the distance between the pair of second attaching portions 82. In this manner, the adjusting operation can be facilitated.

Furthermore, the first attaching portion 81 includes the through hole 811 and the transmission part 812 so that the rotation of the adjusting member 8 can be guided by the through hole 811 and the force is transmitted by the transmission part 812 to facilitate the compression of the sealing member 6.

In addition, the adjusting member 8 includes the adjusting-side tapered outer peripheral surface 83 and the housing-side flange portion 412 includes the flange-side tapered outer peripheral surface 413D, so that the fixing member 7 is clamped to thus enable to generate the force to compress the sealing member 6, thereby enabling to improve the sealing property.

Note that the present disclosure is not limited the aforementioned embodiment, and includes other configurations and the like capable of achieving the objective of the present disclosure, and modifications shown below and the like are also included in the present disclosure. For example, in the aforementioned embodiment, the first attaching portion 81 includes the through hole 811 and the second attaching portion 82 includes the cylindrical portion 822 as a fitting portion, but the second attaching portion may include the through hole and the first attaching portion may include the fitting portion, both the attaching portions may include the through holes, or neither of the attaching portions may include the through hole and a rotatable attaching portion in any other shape may be adopted. Further, the fitting portion is not necessarily formed in a cylindrical shape, but may be formed with a plurality of projections disposed along a circle, for example, or the fitting portion may be in a recessed shape and the end face of the counterpart side may be in a projecting shape, and the shape only needs to be capable of being fitted to the end face of the counterpart side at any rotating angle.

Further, in the aforementioned embodiment, the force is transmitted by the transmission part 812 engaging with the ring member 9, but the transmission part may directly engage with the connection end portion or the target end portion, that is, the configuration may be made such that a projecting portion that is integrally formed with the connection end portion or the target end portion and the transmission part engage with each other. In addition, the adjusting member only needs to have at least the function to cause the axis lines Z1 and Z2 to be eccentric with respect to each other, and may be provided independently of the fixing member. Specifically, the configuration may be made such that the clamping force of the fixing member is not exerted on the adjusting member, and in this case, the transmission part may not be provided.

Furthermore, in the aforementioned embodiment, the adjusting member 8 includes the adjusting-side tapered outer peripheral surface 83 and the housing-side flange portion 413 includes the flange-side tapered outer peripheral surface 413D, but when only the second attaching portion includes the through hole, the connection end portion only needs to include the flange-side tapered outer peripheral surface. In addition, the contacting portion of the fixing member that contacts the adjusting member or each end portion, and the contacting portion of the adjusting member or each end portion that contacts the fixing member may not both necessarily be tapered, and as long as at least one of the contacting portions is tapered, the sealing member 6 can be compressed similarly to the aforementioned embodiment. Further, when the clamping force of the fixing member is not exerted on the adjusting member as described above, the adjusting-side tapered outer peripheral surface may be omitted.

Further, although in the aforementioned embodiments, the pair of pump portions 2A and 2B are both provided with the adjusting members 8, only one pump portion may be provided with the adjusting member while the other pump portion may adopt the conventional connection structure.

The embodiments of the present disclosure have been described in detail above with reference to the accompanying drawings, but the specific configuration is not limited to the configurations of the embodiments and any design changes or the like within the scope without departing the gist of the present disclosure are included in the present disclosure.

What is claimed is:

1. A diaphragm pump including:
   a pair of operating fluid chambers,
   a pair of fluid delivery chambers, wherein each fluid delivery chamber comprises a respective diaphragm body,
   each diaphragm body partitioning a corresponding one of the fluid delivery chambers from a corresponding one of the operating fluid chambers,
   a center rod connected between the diaphragm bodies and reciprocally moving, and
   connection units respectively connecting the pair of fluid delivery chambers, a connection end portion of each of the connection units being connected with a target end portion communicating with each of the fluid delivery chambers, the diaphragm pump further comprising:
   a sealing member disposed between an end face of each the connection end portion and an end face of the corresponding target end portion;
   a fixing member fixing the each connection end portion and the corresponding target end portion while compressing the sealing member; and
   a plurality of adjusting members respectively attached to each connection unit, each adjusting member including:
   a first attaching portion attached to the corresponding connection end portion; and
   a second attaching portion attached to the corresponding target end portion,
   wherein in the adjusting member, the first attaching portion is rotatable having a direction orthogonal to the end face of the connection end portion as an axis line direction and the second attaching portion is rotatable having a direction orthogonal to the end face of the corresponding target end portion as an axis line direction, and a center axis of the first attaching portion and a center axis of the second attaching portion are displaced with respect to each other in a direction along the end face of the corresponding connection end portion and the end face of the corresponding target end portion.

2. The diaphragm pump according to claim 1, wherein, in each adjusting member,
   one of the first attaching portion and the second attaching portion includes a through hole through which the corresponding connection end portion or the corresponding target end portion is inserted, and
   another of the first attaching portion and the second attaching portion includes a fitting portion to be fitted to the end face of the corresponding connection end portion or of the corresponding target end portion.

3. The diaphragm pump according to claim 1, wherein, in each adjusting member,
   at least one of the first attaching portion and the second attaching portion includes a through hole through which the corresponding connection end portion or the corresponding target end portion is inserted and a transmission part transmitting force through direct or indirect engagement with the corresponding connection end portion or the target end portion in moving in a direction of compressing the corresponding sealing member.

4. The diaphragm pump according to claim 3, wherein, in each adjusting member,
   only one of the first attaching portion and the second attaching portion includes the through hole and the transmission part,
   the adjusting member comprises an adjusting-side tapered outer peripheral surface having a diameter increased as the adjusting-side tapered outer peripheral surface approaches another of the first attaching portion and the second attaching portion,
   the corresponding connection end portion or the corresponding target end portion to which the other of the first attaching portion and the second attaching portion is attached comprises a flange-side tapered outer peripheral surface having a diameter increased as the flange-side tapered outer peripheral surface approaches the adjusting member, and
   the fixing member is clamped so as to exert force on an inner periphery side while abutting on the flange-side tapered outer peripheral surface and the adjusting-side tapered outer peripheral surface.

* * * * *